United States Patent
Baptist et al.

(10) Patent No.: US 11,580,076 B1
(45) Date of Patent: Feb. 14, 2023

(54) PRIORITIZING REBUILDING ERASURE CODED DATA IN A STORAGE NETWORK

(71) Applicant: Pure Storage, Inc., Mountain View, CA (US)

(72) Inventors: Andrew D. Baptist, Mt. Pleasant, WI (US); Wesley B. Leggette, Chicago, IL (US); Jason K. Resch, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 289 days.

(21) Appl. No.: 16/738,595

(22) Filed: Jan. 9, 2020

Related U.S. Application Data

(63) Continuation of application No. 15/804,069, filed on Nov. 6, 2017, now abandoned, which is a continuation-in-part of application No. 14/055,174, filed on Oct. 16, 2013, now Pat. No. 9,811,533.

(60) Provisional application No. 61/733,686, filed on Dec. 5, 2012.

(51) Int. Cl.
*G06F 7/00* (2006.01)
*G06F 16/182* (2019.01)

(52) U.S. Cl.
CPC ................... *G06F 16/182* (2019.01)

(58) Field of Classification Search
CPC .... G06F 16/182; G06F 21/62; G06F 11/0727; G06F 3/067; G06F 13/161
USPC .......... 707/783, 636, 797, 823–831
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,822,582 A | 10/1998 | Doragh |

(Continued)

FOREIGN PATENT DOCUMENTS

| | | | |
|---|---|---|---|
| EP | 2460080 A2 | * | 7/2009 |
| EP | 2460080 | * | 6/2012 |

OTHER PUBLICATIONS

Erasure Codes for Storage Applications; Dr. James S. Plank; Fast 2005.*

(Continued)

*Primary Examiner* — Daniel A Kuddus
(74) *Attorney, Agent, or Firm* — Garlick & Markison; Timothy W. Markison; Timothy D. Taylor

(57) ABSTRACT

A method includes scanning, from plurality of sets of encoded data slices to plurality of sets of encoded data slices, to identify encoded data slices that are in need of rebuilding. The method further includes adding the identified encoded data slices into a first level rebuilding queue. The method further includes analyzing the identified encoded data slices based on a rebuilding prioritization function to establish a prioritization for the identified encoded data slices. The method further includes transferring, based on the analyzing, a first group of encoded data slices into a first priority rebuilding queue and a second group of encoded data slices into a second priority rebuilding queue. The method further includes rebuilding the first and second group of encoded data slices based on a rebuilding prioritization protocol.

16 Claims, 9 Drawing Sheets

(56) References Cited

U.S. PATENT DOCUMENTS

| | | | |
|---|---|---|---|
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 8,479,046 B1 | 7/2013 | Bailey et al. | |
| 8,519,351 B2* | 8/2013 | Dey | C02F 1/447 250/363.08 |
| 8,548,913 B2* | 10/2013 | Grube | G06Q 20/401 705/40 |
| 8,555,130 B2* | 10/2013 | Baptist | G06F 11/1076 711/111 |
| 8,566,354 B2* | 10/2013 | Grube | G06F 11/076 375/240.03 |
| 9,665,446 B1 | 5/2017 | Hadas et al. | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll | |
| 2007/0079081 A1* | 4/2007 | Gladwin | G06F 21/6227 711/154 |
| 2007/0079082 A1* | 4/2007 | Gladwin | G06F 11/1076 711/154 |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au et al. | |
| 2007/0234110 A1 | 10/2007 | Soran | |
| 2007/0283167 A1 | 12/2007 | Venters, III | |
| 2008/0183975 A1* | 7/2008 | Foster | G06F 11/1004 711/E12.001 |
| 2009/0094250 A1* | 4/2009 | Dhuse | G06F 11/1076 |
| 2009/0094251 A1 | 4/2009 | Gladwin | |
| 2009/0094318 A1 | 4/2009 | Gladwin | |
| 2010/0023524 A1 | 1/2010 | Gladwin | |
| 2010/0161916 A1* | 6/2010 | Thornton | H04L 69/40 709/219 |
| 2010/0169391 A1 | 7/2010 | Baptist | |
| 2010/0306578 A1* | 12/2010 | Thornton | G06F 11/1076 714/6.12 |
| 2011/0029711 A1* | 2/2011 | Dhuse | G06F 11/1076 711/4 |
| 2011/0029809 A1* | 2/2011 | Dhuse | G06F 11/1092 714/6.1 |
| 2011/0029836 A1* | 2/2011 | Dhuse | G06F 11/08 714/752 |
| 2011/0055170 A1 | 3/2011 | Mark | |
| 2011/0055277 A1 | 3/2011 | Resch | |
| 2011/0078177 A1* | 3/2011 | Fakeih | G06F 16/2474 707/769 |
| 2011/0126295 A1 | 5/2011 | Resch | |
| 2011/0184997 A1 | 7/2011 | Grube | |
| 2011/0264717 A1* | 10/2011 | Grube | H04L 9/085 707/827 |
| 2011/0264962 A1 | 10/2011 | Baptist et al. | |
| 2011/0289122 A1 | 11/2011 | Grube | |
| 2012/0079371 A1 | 3/2012 | Tsai | |
| 2012/0159498 A1 | 6/2012 | Wilmarth | |
| 2012/0311345 A1 | 12/2012 | Dhuse | |
| 2013/0086442 A1* | 4/2013 | Baptist | G06F 11/1076 714/752 |
| 2013/0103671 A1 | 4/2013 | Tretjakov | |
| 2013/0103678 A1 | 4/2013 | Tretjakov | |
| 2013/0151558 A1 | 6/2013 | Sanchez | |
| 2016/0041868 A1 | 2/2016 | Davis | |
| 2016/0357869 A1 | 12/2016 | Hang | |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Croup; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner

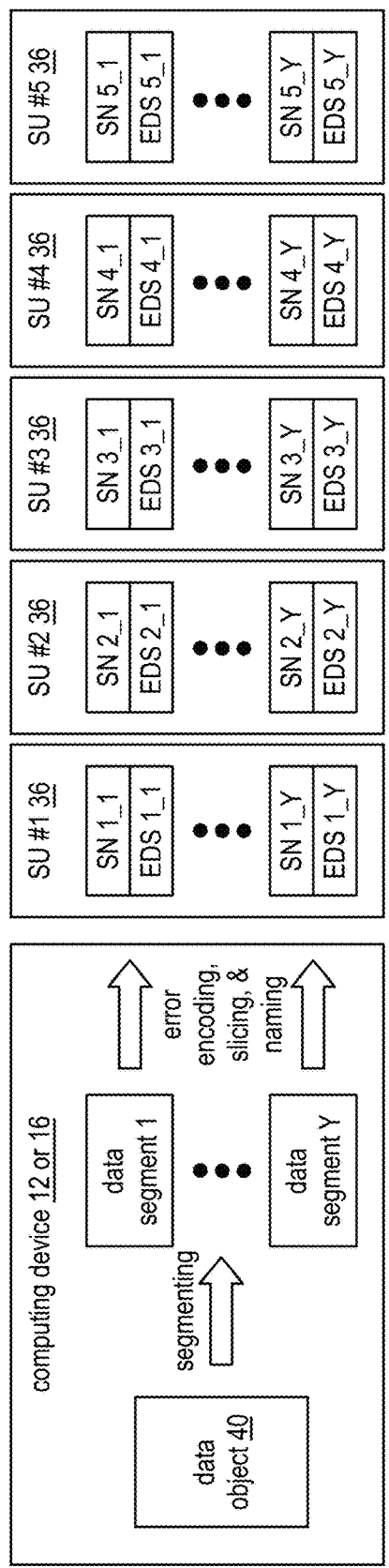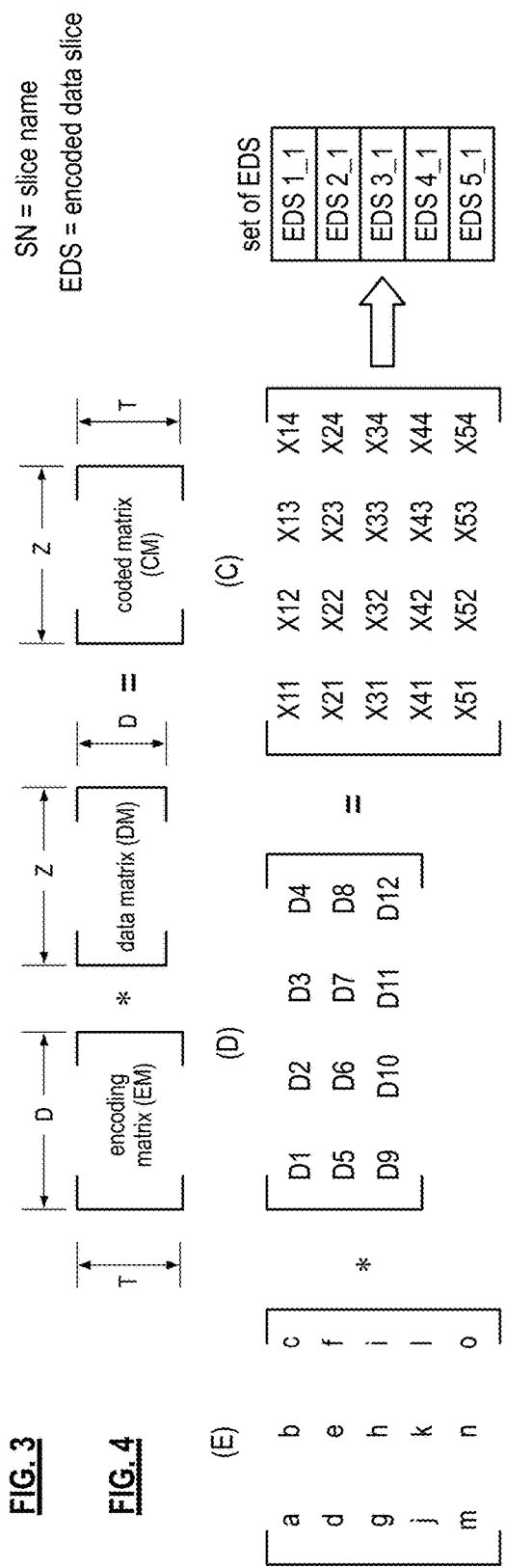
FIG. 3
FIG. 4
FIG. 5
FIG. 6

US 11,580,076 B1

PRIORITIZING REBUILDING ERASURE CODED DATA IN A STORAGE NETWORK

CROSS-REFERENCE TO RELATED APPLICATIONS

The present U.S. Utility Patent Application claims priority pursuant to 35 U.S.C. § 120 as a continuation of U.S. Utility application Ser. No. 15/804,069, entitled "USING DISPERSED QUEUES FOR REBUILDING FUNCTIONS AND PRIORITIZATION", filed Nov. 6, 2017, which is a continuation-in-part of U.S. Utility application Ser. No. 14/055,174, entitled "ACCESSING DISTRIBUTED COMPUTING FUNCTIONS IN A DISTRIBUTED COMPUTING SYSTEM", filed Oct. 16, 2013, issued as U.S. Pat. No. 9,811,533 on Nov. 7, 2017, which claims priority pursuant to 35 U.S.C. § 119(e) to U.S. Provisional Application No. 61/733,686, entitled "GENERATING A DISPERSED QUEUE", filed Dec. 5, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is further known, over time, data may become corrupted or outdated, and may not be able to be reproduced once a certain amount of the data includes an error. For example, in a RAID 5 system with 3 disks, if more than one disk fails, entire arrays of data may be unrecoverable.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
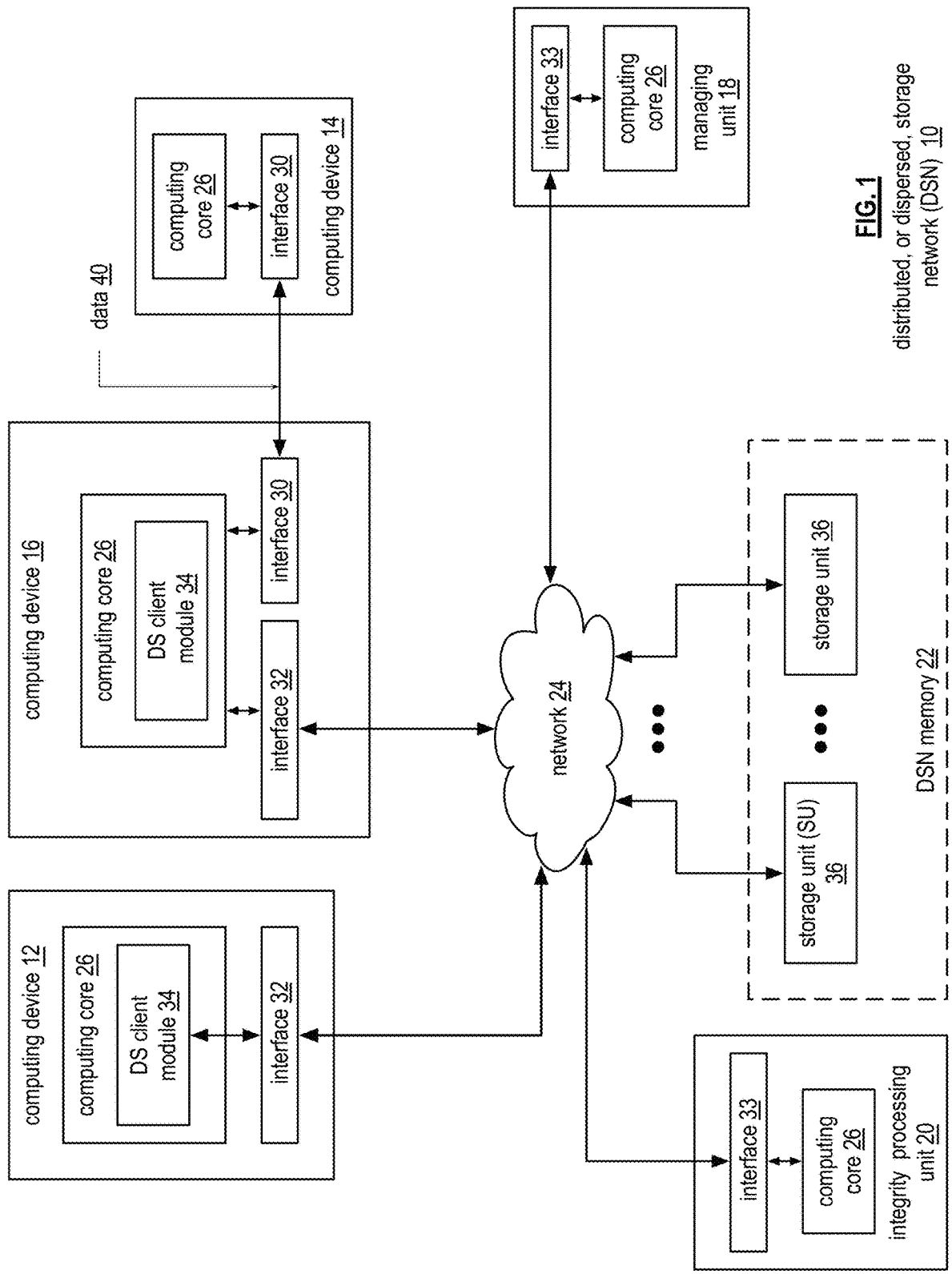
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
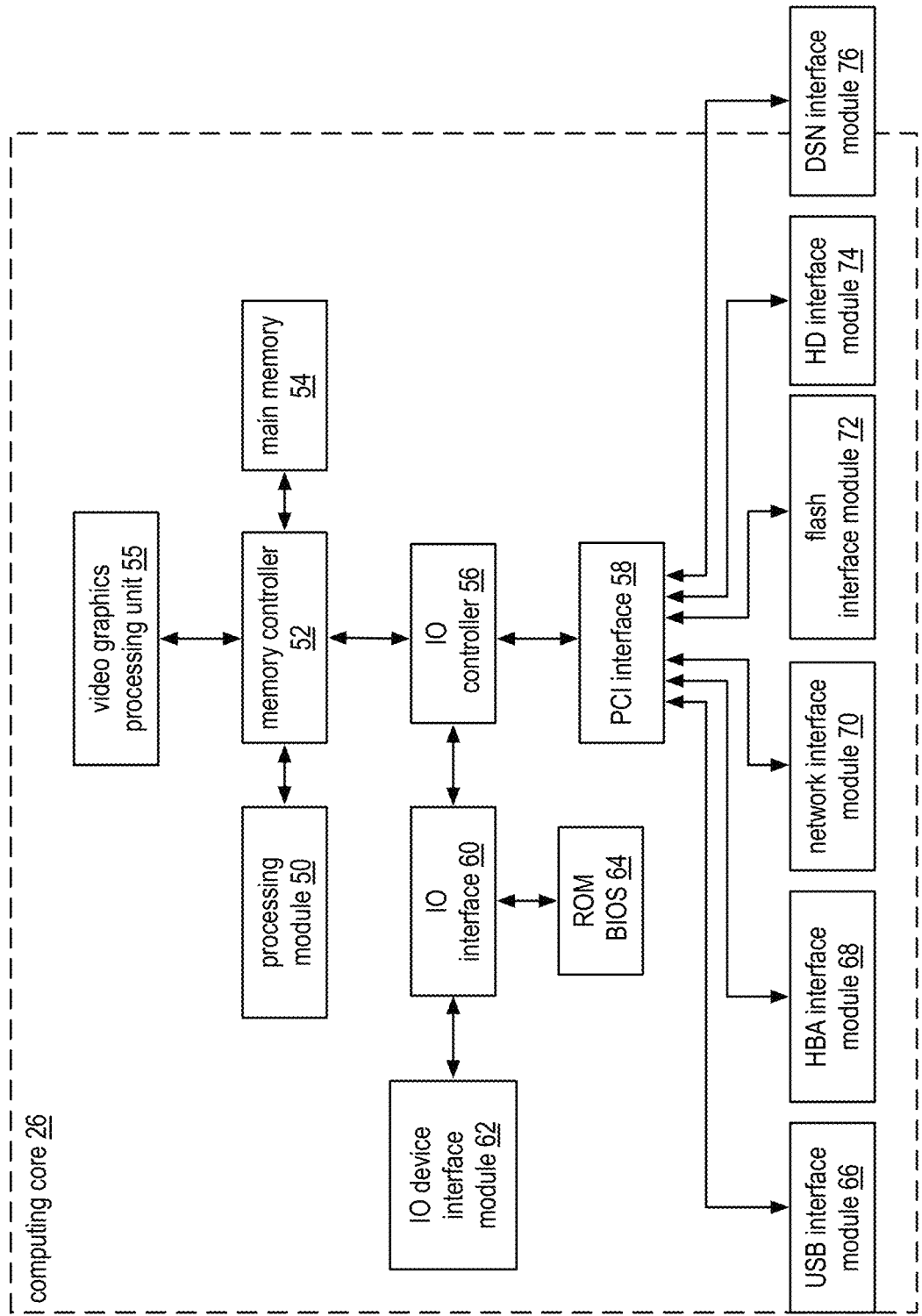
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
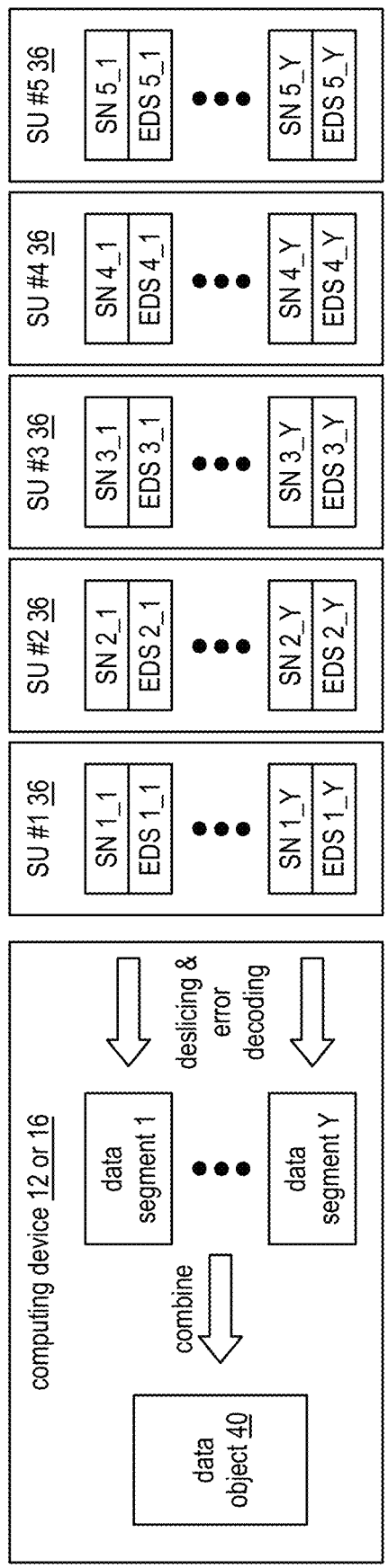
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
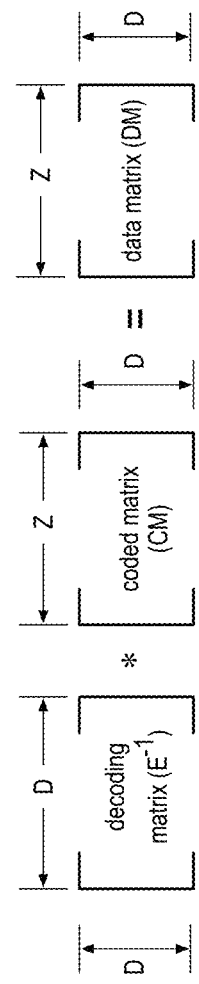
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
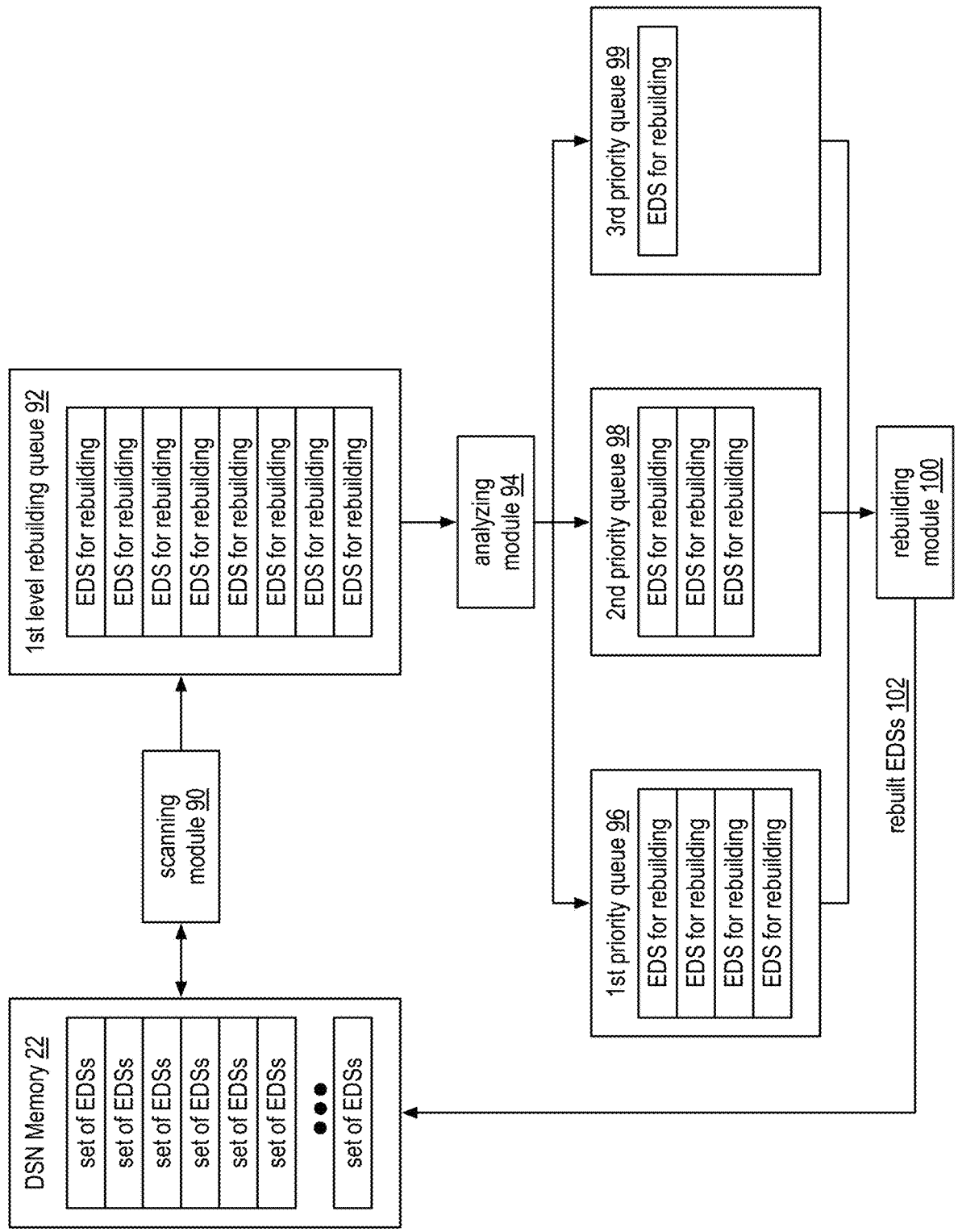
FIG. 9 is a schematic block diagram of an embodiment of rebuilding encoded data slices in accordance with the present invention.

FIG. 9 is a schematic block diagram of an embodiment of rebuilding encoded data slices in a dispersed storage network (DSN). The DSN includes a DSN memory 22, a scanning module 90, a $1^{st}$ level rebuilding queue 92, an analyzing module 94, a $1^{st}$ priority queue 96, a $2^{nd}$ priority queue 98, a $3^{rd}$ priority queue 99, and a rebuilding module 100. Note one or more of the scanning module 90, the analyzing module 94 and the rebuilding module 100 may be implemented within a computing device or within multiple computing devices. As one example, a first computing device includes the scanning module 90, a second computing device includes the analyzing module 94, and a third computing device includes the rebuilding module 90. As another example, a first computing device includes the scanning module 90, the analyzing module 94 and the rebuilding module 100. As yet another example, a first computing device includes the scanning module 90, and a second computing device includes the analyzing module 94 and the rebuilding module 100.

In an example of operation, the scanning module 90 scans a plurality of sets of encoded data slices that are stored in DSN memory 22 to identify encoded data slices that need rebuilding (e.g., missing, outdated version, flagged, etc.). For example, the scanning module sends list requests to storage units of the DSN that include a request to list slice names of encoded data slices being stored by the respective storage units. The scanning module 90 then receives list responses from the storage units that include a list of slices names of encoded data slices that are stored by the respective storage units. The scanning module then interprets the list of slices names of encoded data slices that are stored by the respective storage units to identify the encoded data slices that need rebuilding.

Continuing with the example of operation, when the scanning module 90 identifies encoded data slices for rebuilding, the scanning module 90 adds the identified encoded data slices to the $1^{st}$ level rebuilding queue 92. As an example, the scanning module 90 scans a first set of encoded data slices and determines that a fifth encoded data slice of the first set is corrupted (e.g., a computed slice name does not match a stored slice name) and an eighth encoded data slice of the first set is missing (e.g., the storage unit did not respond with a slice name for the eighth encoded data slice). The scanning module 90 then adds the fifth and eighth encoded data slices to the $1^{st}$ level rebuilding queue 92.

As encoded data slices for rebuilding are added to the $1^{st}$ level rebuilding queue 92, the analyzing module 94 analyzes the encoded data slices of the $1^{st}$ level rebuilding queue 92 based on a rebuilding prioritization function to establish a priority level for at least some of the identified encoded data slices. For example, during a first timeframe, the $1^{st}$ level rebuilding includes eight encoded data slices for rebuilding. The analyzing module analyzes the eight encoded data slices for rebuilding based on the rebuilding prioritization function and determines that a first group of four encoded data slices are of a first priority, that a second group of three encoded data slices are of a second priority, and a third group of one encoded data slice is of a third priority. Having determined the priorities, the analyzing module transfers the first group to the first priority queue 96, the second group to the second priority queue 98 and the third group to the third priority queue 99.

After transferring at least one group of encoded data slices to one of the priority queues, the rebuilding module 100 rebuilds encoded data slices of the at least one group in accordance with a rebuilding prioritization protocol. Note the rebuilding prioritization protocol comprises one of rebuilding the first group of encoded data slices before rebuilding the second group of encoded data slices, rebuilding the first and second group of encoded data slices in an imbalanced round robin manner that favors rebuilding the first group of encoded data slices, and rebuilding the first and second group of encoded data slices in accordance with an anti-starvation protocol.

For example, the rebuilding module 100 may rebuild all encoded data slices in the first priority queue 96 before rebuilding any encoded data slices in the second priority queue 96. As another example, the rebuilding module 100 may rebuild in a round robin fashion such that for every four encoded data slices that are rebuilt in the first priority queue 96, two encoded data slices are rebuilt in the second priority queue 98, and one encoded data slice is rebuilt in the third priority queue 99. As yet another example, the rebuilding module 100 may spend 80% of time rebuilding encoded data slices of the $1^{st}$ priority queue 96, 15% of time rebuilding encoded data slices of the $2^{nd}$ priority queue 98 and 5% of time rebuilding encoded data slices of the $3^{rd}$ priority queue 99. After rebuilding the encoded data slices for rebuilding, the rebuilding module 100 sends the rebuilt encoded data slices 102 to DSN memory 22 for storage.

Figure 10:
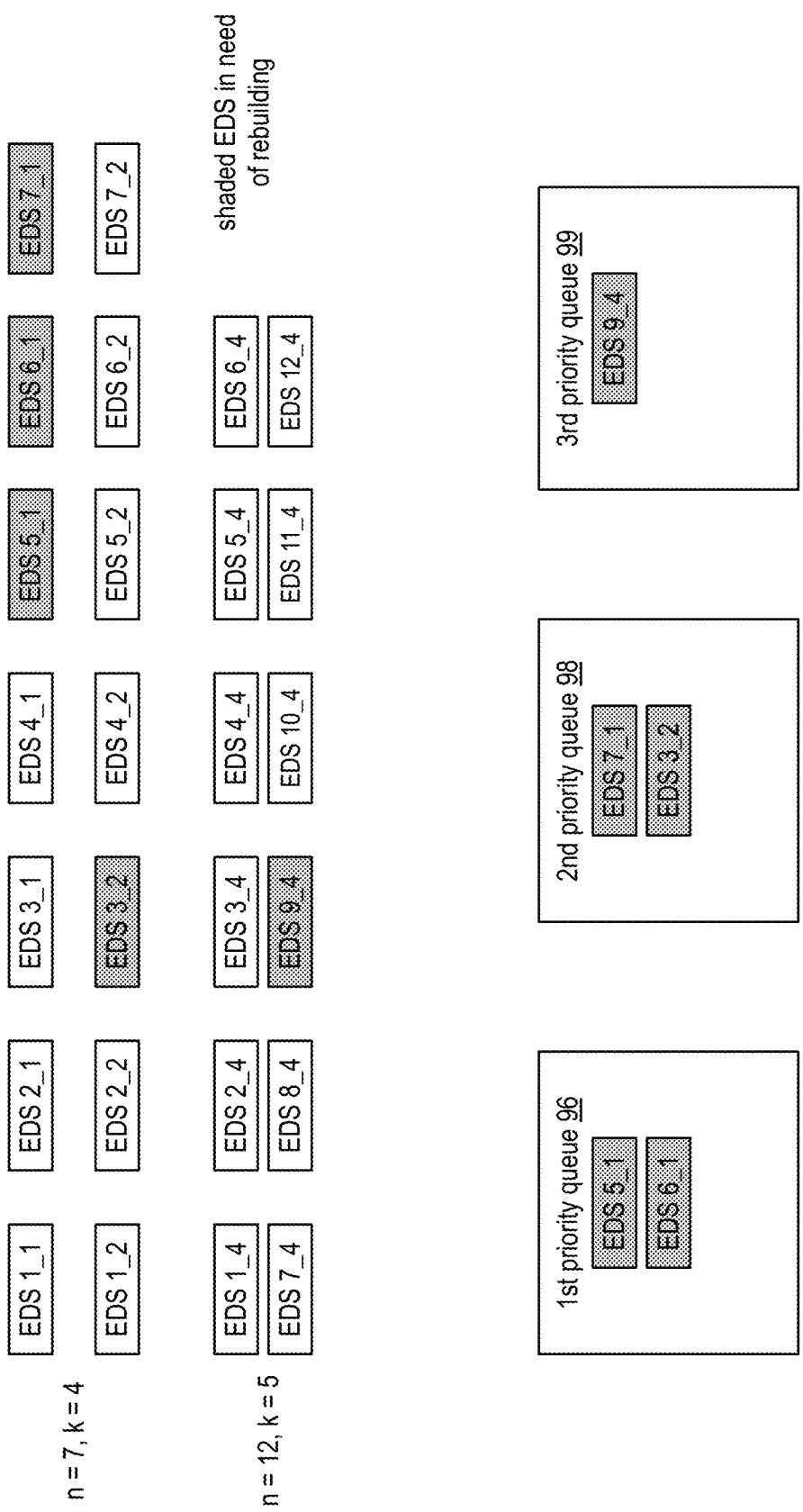
FIG. 10 is a schematic block diagram of an example of determining prioritization of encoded data slices in accordance with the present invention.

FIG. 10 is a schematic block diagram of an example of determining prioritization of encoded data slices. The encoded data slices and add to priority queues in accordance with the prioritization. The priority queues include $1^{st}$ priority queue 96, $2^{nd}$ priority queue 98, and $3^{rd}$ priority queue 99. Note that although three priority queues are illustrated, there may be less or more priority queues in other embodiments.

As illustrated, a first and a second set of encoded data slices are associated with a first data object with dispersed storage error encoded parameters that include a pillar width (e.g., n) of 7 and a decode threshold (e.g., k) of 4, and a third set of encoded data slices is associated with a second data object with dispersed storage error encoded parameters that include a pillar width of 12 and a decode threshold of 5.

The shaded encoded data slices are encoded data slices that are in need of rebuilding (e.g., corrupted, outdated, flagged, etc.). For example, in the first set of encoded data slices of the first data object (e.g., EDS 1_1 through EDS 7_1), encoded data slices EDS 5_1, EDS 6_1, and EDS 7_1 need rebuilding, in the second set of encoded data slices of the first data object (e.g., EDS 1_2 through EDS 7_2), encoded data slice EDS 3_2 need rebuilding, and in the third set of encoded data slices of the second data object (e.g., EDS 1_4 through EDS 12_4), encoded data slice EDS 9_4 needs rebuilding. The analyzing module 94 module analyzes the encoded data slices that need rebuilding based on a rebuilding prioritization function to establish a prioritization for at least some of the identified encoded data slices (e.g., EDS 5_1, EDS 6_1, EDS 7_1, EDS 3_2 and EDS 9_4).

In this example, the analyzing module determines EDS 5_1 and EDS 6_1 are a first priority, EDS 7_1 and EDS 3_2 are a second priority, and EDS 9_4 is a third priority. The rebuilding prioritization function that establishes the priorities may be based on a loss of data risk analysis function that is executed on a set of encoded data slices by set of encoded data slices basis. The loss of data risk may be determined by one or more of a pillar number, a decode threshold number, a number of encoded data slices in a set of encoded data slices that need rebuilding, and a storage unit reliability.

For example, the first set of encoded data slices (EDS 1_1-EDS 7_1) has a pillar width of 7, a decode threshold of 4 and 3 encoded data slices that need rebuilding. Thus, as the first set of encoded data slices can tolerate loss of another encoded data slice, at least one of the encoded data slices (e.g., EDS 5_1, EDS 6_1, EDS 7_1) should be given the highest priority. Note that within the highest priority, one or more of the encoded data slices may have a higher priority. For example, initially EDS 5_1, EDS 6_1 and EDS 7_1 would all be included in the first priority, however, once EDS 5_1 has been rebuilt, EDS 6_1 will have a lower loss of data risk as the first set may now tolerate failure of one encoded data slice. Further, once EDS 5_1 and 6_1 are both rebuilt, the loss of data risk will be lower as the first set of encoded data slices may now tolerate two failures and still be recoverable. Thus, EDS 7_1 may instead be determined to have a second priority, which is lower than the first priority. In this example EDS 7_1 and EDS 3_2 are of the second priority, however the priority for EDS 7_1 may be higher than EDS 3_2, even though the slice risk value (e.g., difference between the redundancy value (e.g., a difference between the pillar number and the decode threshold number) and the number of encoded data slices in the set of encoded data slices that are in need of rebuilding) are substantially similar. In one example, this may be due to a storage unit reliability level of a storage unit storing an encoded data slice of the second set of encoded data slice being higher that a storage unit reliability level of a storage unit storing an encoded data slice of the first set of encoded data slices. Thus, the first set of encoded data slices has a higher loss of data risk than the second set of encoded data slices.

The third set of encoded data slices includes a pillar width of 12, a decode threshold of 5 and 1 encoded data slice that needs rebuilding. Thus, at this time, the third set could tolerate failure of up to six encoded data slices and still be recoverable. As such, EDS 9_4 may be determined to have a low rebuilding priority (e.g., a third priority) and thus may be transferred to the $3^{rd}$ priority queue 99.

Figure 11:
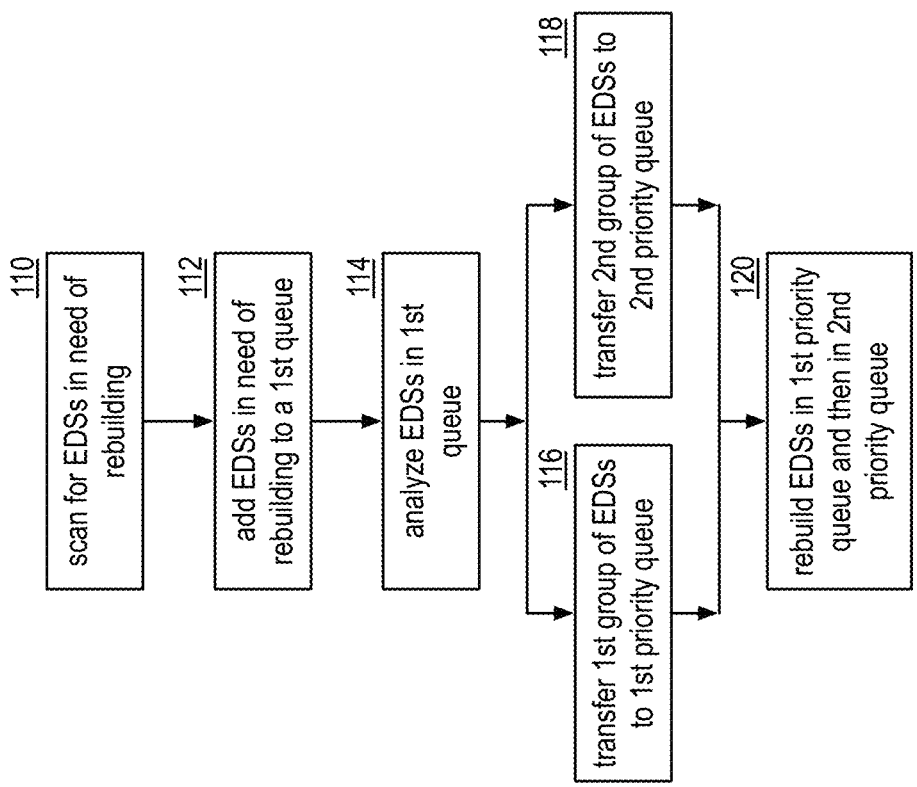
FIG. 11 is a flowchart illustrating an example of a method of rebuilding encoded data slices in accordance with the present invention.

FIG. 11 is a flowchart illustrating an example of a method of rebuilding encoded data slices. The method begins with step 110, where a scanning module of a computing device scans, from one or more plurality of sets of encoded data slices to other one or more plurality of sets of encoded data slices, to identify encoded data slices that need rebuilding. As an example of the scanning, the scanning module sends list requests to storage units of the DSN, that include a request to list slice names of encoded data slices being stored by the respective storage units. Next, the scanning module receives list responses from the storage units that include a list of slices names of encoded data slices that are stored by the respective storage units. The scanning module then interprets the list of slices names of encoded data slices that are stored by the respective storage units to identify the encoded data slices that need rebuilding.

The method continues with step 112, where the scanning module adds the identified encoded data slices into a first level rebuilding queue. The method continues with step 114, where an analyzing module of a computing device analyzes identified encoded data slices in the first level rebuilding queue based on a rebuilding prioritization function to establish a prioritization for at least some of the identified encoded data slices in the first level rebuilding queue. Note the prioritization function includes a loss of data risk analysis function that is executed on a set of encoded data slices by set of encoded data slices basis.

For example, for a set of encoded data slices of the one or more plurality of sets of encoded data slices or of the other one or more plurality of sets of encoded data slices, the analyzing module determines a pillar number, a decode threshold number, a number of encoded data slices in the set of encoded data slices that are in need of rebuilding and determines a redundancy value based on a difference between the pillar number and the decode threshold number. Next, the analyzing module determines a slice risk value based on a difference between the redundancy value and the number of encoded data slices in the set of encoded data slices that are in need of rebuilding and determines storage unit reliability of a set of storage units of the DSN that is storing the set of encoded data slices. Having determined the slice risk value and the storage unit reliability, the analyzing module generates a loss of data risk indication based on the slice risk value and the storage unit reliability. When the loss of data risk indication is above a threshold, the analyzing module places one or more encoded data slices of the set of encoded data slices that need rebuilding in the first group of encoded data slices.

When the at least some of the identified encoded data slices in the first level rebuilding queue are of a first priority, the method continues with step 116, where the analyzing module transfers a first group of encoded data slices in the first level rebuilding queue into a first priority rebuilding queue based on the analyzing.

When the at least some of the identified encoded data slices in the first level rebuilding queue are of a second priority, the method continues with step 118, where the analyzing module transfers a second group of encoded data slices in the first level rebuilding queue into a second priority rebuilding queue based on the analyzing. Note the first rebuilding priority queue has priority over the second priority rebuilding queue.

The method continues with step 120, where a rebuilding module of a computing device rebuilds the first and second group of encoded data slices based on a rebuilding prioritization protocol. As an example of the rebuilding, the rebuilding module may determine whether the time to rebuild the first group of encoded data slices will exceed a priority rebuild time threshold. When the time to rebuild the first group of encoded data slices will exceed the priority rebuild time threshold, the rebuilding module allocates a sub-group of the first group of encoded data slices to a second rebuilding module for rebuilding. Note the second rebuilding module may be operable on the first computing device, the second computing device, the third computing device, or a fourth computing device of the one or more computing devices. Further note, the rebuilding prioritization protocol includes one of rebuilding the first group of encoded data slices before rebuilding the second group of encoded data slices, rebuilding the first and second group of encoded data slices in an imbalanced round robin manner that favors rebuilding the first group of encoded data slices, and rebuilding the first and second group of encoded data slices in accordance with an anti-starvation protocol.

In one instance, when an encoded data slice has been in a lower priority group (e.g., the second group, the third group, etc.) of encoded data slices for a predetermined period of time, the encoded data slice may be re-analyzed based on the rebuilding prioritization function to determine whether the encoded data slice should be moved to a higher priority group (e.g., the first group) of encoded data slices. When it is determined to move the encoded data slice to the first group of encoded data slices, a computing device (e.g., the analyzing module 94, the rebuilding module 100) transfers the encoded data slice to the first group of encoded data slices.

Figure 12:
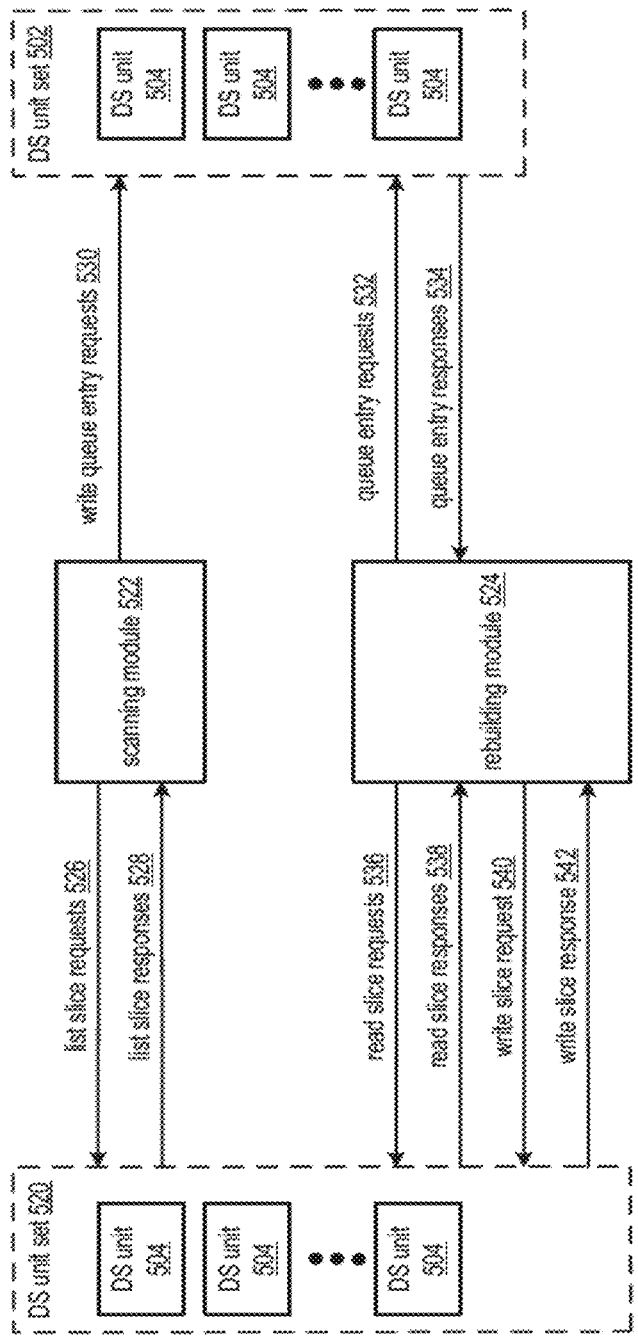
FIG. 12 is a schematic block diagram of another embodiment of a dispersed storage network (DSN) in accordance with the present invention.

FIG. 12 is a schematic block diagram of another embodiment of a dispersed storage system that includes one or more dispersed storage (DS) unit sets 520, 502, a scanning module 522, and a rebuilding module 524. Each DS unit set of the one or more DS unit sets 520, 502 includes a set of DS units 504. In a first embodiment, as illustrated, the one or more DS unit sets are implemented as two DS unit sets 520, 502. Alternatively, in another embodiment, the one or more DS unit sets are implemented as a common DS unit set. The scanning module 522 and the rebuilding module 524 may be implemented utilizing one or more of a user device, a server, a processing module, a computer, a DS processing unit, a DS processing module, a DS unit, a distributed storage and task (DST) processing unit, a DST processing module, a DST client module, and a DST execution unit. For example, the scanning module 522 is implemented in a first DST execution unit and the rebuilding module 524 is implemented in a second DST execution unit. As another example, the scanning module 522 and the rebuilding module 524 are implemented utilizing a common DST execution unit.

The system functions to detect one or more stored slices in error (e.g., missing and/or corrupted slices that should be stored in one or more DS units 504 of a first DS unit set 520) and to remedy (e.g., rebuild) the one or more stored slices in error. The scanning module 522 functions to detect the one or more stored slices in error and the rebuilding module 524 functions to remedy the one or more stored slices in error. The scanning module 522 communicates identities of the one or more stored slices in error to the rebuilding module 524 by utilizing entries of a dispersed queue. A second DS unit set 502 of the one or more DS unit sets is utilized to provide the dispersed queue.

The scanning module 522 functions to detect the one or more stored slices in error and to update the dispersed queue with an entry pertaining to at least one stored slice in error. The scanning module 522 functions to detect the one or more stored slices in error through a series of steps. A first step includes generating a set of list requests 526 that include a range of slice names to be scanned associated with the first DS unit set. A second step includes outputting the set of list requests 526 to the first DS unit set 520. A third step includes comparing list slice responses 528 from the first DS unit set 520 to identify one or more slice names associated with the one or more stored slices in error. For example, the scanning module 522 identifies a slice name that is not listed in a list response when slice names of a set of slice names that are associated with the slice name are received via other list responses.

The scanning module 522 functions to update the dispersed queue through a series of steps. A first step includes assigning a rebuilding priority level for the slice in error. A second step includes generating a queue entry that includes one or more of the slice name, the rebuilding priority level, a rebuilding task indicator, and identity of the set of slice names that are associated with the slice name (e.g., a source name). A third step includes identifying the dispersed queue based on one or more of the source name, the rebuilding priority level, a rebuilding module availability level indicator, and a queue availability level indicator. A fourth step includes storing the queue entry in the identified dispersed queue associated with the second DS unit set. The storing includes encoding the queue entry to produce a set of entry slices, identifying a rebuilding dispersed queue, generating a set of entry slice names for the queue entry, generating a set of write queue entry requests 530 that includes the set of entry slices and the set of entry slice names, and outputting the set of write queue entry requests 530 to the second DS unit set 502.

The rebuilding module 524 functions to remedy the one or more stored slices in error through a series of steps. A first step includes retrieving a queue entry from a highest priority dispersed queue from the second DS unit set 502. The retrieving includes outputting a set of queue entry requests 532 that includes a set of list requests associated with a slice name range of the highest priority dispersed queue, receiving a set of queue entry responses 534 that includes a set of list responses, identifying a set of slice names associated with the queue entry (e.g., lowest slice names of a range of slice names associated with a first in first out (FIFO) approach), generating and outputting a set of delete read slice requests that includes the set of slice names to the second DS unit set 502, receiving at least a decode threshold number of entry slices from another set of queue entry responses 534, and decoding the at least a decode threshold number of entry slices to produce the queue entry.

A second step to remedy the one or more stored slices in error includes extracting the slice name of the slice in error from the queue entry (e.g., the queue entry including a distributed computing function to rebuild and the slice name). A third step includes facilitating rebuilding of the slice in error (e.g., directly rebuilding, issuing a rebuilding request to another rebuilding module). When directly rebuilding, the rebuilding module 524 outputs, to the first DS unit set 520, at least a decode threshold number of read slice requests 536 that includes slice names associated with the slice in error, receives at least a decode threshold number of read slice responses 538 that includes slices associated with the slice in error, decodes the slices associated with the slice in error to produce a recovered data segment, and encodes the recovered data segment to produce a rebuilt slice. A fourth step includes generating and outputting, to the first DS unit set 520, a write slice request 540 that includes the slice name of the slice in error and the rebuilt slice. A fifth step includes receiving a write slice response 542 that includes status of writing the rebuilt slice.

When the status of writing the rebuilt slice is favorable (e.g., succeeded), the rebuilding module 524 generates and outputs, to the second DS unit set 502, a set of queue entry requests 532 that includes a set of commit requests associated with the delete read requests previously output to the second DS unit set 502 with regards to retrieving the queue entry. Such a set of requests 532 completes deletion of the queue entry to remove the queue entry from the dispersed queue since the slice in error has been successfully rebuilt.

Figure 13:
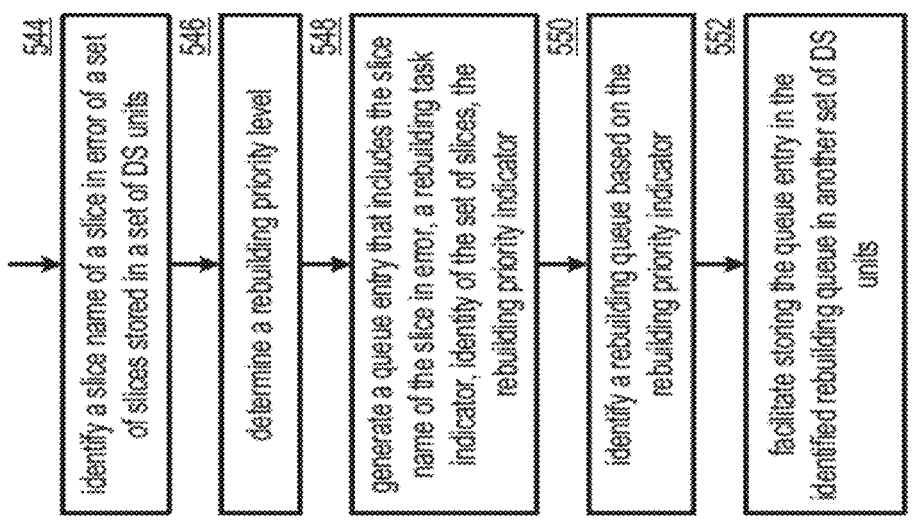
FIG. 13 is a flowchart illustrating an example of queuing a rebuilding task in accordance with the present invention.

FIG. 13 is a flowchart illustrating an example of queuing a rebuilding task. The method begins at step 544 where a processing module (e.g., of scanning module) identifies a slice name of a slice in error of a set of slices stored in a set of dispersed storage (DS) units. The identifying includes generating and outputting, to the set of DS units, a set of list slice requests to include a slice name range to be scanned for errors, receiving list slice responses, and identifying the slice name of the slice in error based on a comparison of list slice responses. The method continues at step 546 where the processing module determines a rebuilding priority level. The priority level may be based on one or more of a number of slice errors associated with a common set of slices, a vault identifier, a data type indicator, a source name of the common set of slices, and a data priority level. For example, a higher rebuilding priority level may be assigned when the number of slice errors associated with a common set of slices is greater than a slice threshold level.

The method continues at step 548 where the processing module generates a queue entry that includes the slice name of the slice in error, a rebuilding task indicator (e.g., a rebuilding opcode), identity of the set of slices (e.g., the source name of the common set of slices), and the rebuilding priority indicator. The method continues at step 550 where the processing module identifies a rebuilding queue based on the rebuilding priority indicator. The identifying may include one or more of a lookup (e.g., a queue list by rebuilding priority level), a query, and receiving. The method continues at step 552 where the processing module facilitates storing the queue entry in the identified rebuilding queue in another set of DS units. Alternatively, the processing module facilitates storage of the queue entry in the identified rebuilding queue in the set of DS units.

The facilitating storage of the queue entry in the identified rebuilding queue includes a series of steps. A first step includes generating a set of queue entry slice names based on one or more of a queue vault identifier, a queue name associated with the identified rebuilding queue, a DS processing module identifier associated with the processing module, a client identifier based on a vault lookup, and a current timestamp. A second step includes encoding the queue entry using a dispersed storage error coding function to produce a set of queue entry slices. A third step includes generating a set of write slice requests that includes the set of queue entry slices and the set of queue entry slice names. A fourth step includes outputting the set of write slice requests to the other set of DS units when utilizing the other set of DS units for storage of the queue entry.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices in a storage network, the method comprises:
   scanning, from one or more plurality of sets of encoded data slices to other one or more plurality of sets of encoded data slices, to identify encoded data slices to include in a rebuilding process;
   adding the identified encoded data slices into a first level rebuilding queue;
   analyzing the identified encoded data slices in the first level rebuilding queue based on a rebuilding prioritization function to establish a prioritization for at least some of the identified encoded data slices in the first level rebuilding queue;
   transferring, based on the analyzing, a first group of encoded data slices in the first level rebuilding queue into a second rebuilding queue and a second group of encoded data slices in the first level rebuilding queue into a third rebuilding queue, wherein the second rebuilding queue has priority over the third rebuilding queue; and
   rebuilding the first and second group of encoded data slices based on a rebuilding prioritization protocol.

2. The method of claim 1, wherein the scanning comprises:
   sending list requests to storage units of the storage network, wherein the list requests include a request to list slice names of encoded data slices being stored by the respective storage units;
   receiving list responses from the storage units, wherein the list responses includes a list of slice names of encoded data slices that are stored by the respective storage units; and
   interpreting the list of slice names of encoded data slices that are stored by the respective storage units to identify the encoded data slices to include in the rebuilding process.

3. The method of claim 1, wherein the rebuilding prioritization function comprises:
   a loss of data risk analysis function that is executed on a set of encoded data slices by set of encoded data slices basis.

4. The method of claim 3 further comprises:
   for a set of encoded data slices of the one or more plurality of sets of encoded data slices or of the other one or more plurality of sets of encoded data slices:
      determining a pillar number, a decode threshold number, and a number of encoded data slices in the set of encoded data slices associated with the rebuilding process;
      determining a redundancy value based on a difference between the pillar number and the decode threshold number;
      determining a slice risk value based on a difference between the redundancy value and the number of encoded data slices in the set of encoded data slices associated with the rebuilding process;

determining a reliability level for a storage unit of a set of storage units of the storage network that is storing the set of encoded data slices;

generating a loss of data risk indication based on the slice risk value and the reliability level associated with the storage unit; and when the loss of data risk indication is above a threshold, placing one or more encoded data slices of the set of encoded data slices associated with the rebuilding process in the first group of encoded data slices.

5. The method of claim 1, wherein the rebuilding further comprises:

determining whether a time to rebuild the first group of encoded data slices will exceed a priority rebuild time threshold; and when the time to rebuild the first group of encoded data slices will exceed the priority rebuild time threshold, allocating a sub-group of the first group of encoded data slices for rebuilding by at least one computing device of the one or more computing devices.

6. The method of claim 1, wherein the rebuilding prioritization protocol comprises one of:

rebuilding the first group of encoded data slices before rebuilding the second group of encoded data slices;

rebuilding the first and second group of encoded data slices in an imbalanced round robin manner wherein the rebuilding of the first group of encoded data slices is weighted greater than the rebuilding of the second group of encoded data slices; and rebuilding the first and second group of encoded data slices in accordance with an anti-starvation protocol.

7. The method of claim 1 further comprises:

when an encoded data slice has been in the second group of encoded data slices for a predetermined period of time, re-analyzing the encoded data slice based on the rebuilding prioritization function to determine whether the encoded data slice should be moved to the first group of encoded data slices; and when determined to move the encoded data slice to the first group of encoded data slices, transferring the encoded data slice to the first group of encoded data slices.

8. The method of claim 1 further comprises:

transferring a third group of encoded data slices in the second rebuilding queue into a fourth rebuilding queue based on the analyzing, wherein the third rebuilding queue has priority over the fourth rebuilding queue; and rebuilding the first, second, and third group of encoded data slices based on the rebuilding prioritization protocol.

9. A computer readable memory device comprises:

at least one memory section that stores operational instructions that, when executed by one or more computing devices in a storage network, causes the one or more computing devices to:

scan, from one or more plurality of sets of encoded data slices to other one or more plurality of sets of encoded data slices, to identify encoded data slices to include in a rebuilding process;

add the identified encoded data slices into a first level rebuilding queue;

analyze the identified encoded data slices in the first level rebuilding queue based on a rebuilding prioritization function to establish a prioritization for at least some of the identified encoded data slices in the first level rebuilding queue;

transfer, based on the analyzing, a first group of encoded data slices in the first level rebuilding queue into a second rebuilding queue and a second group of encoded data slices in the first level rebuilding queue into a third rebuilding queue, wherein the second rebuilding queue has priority over the third rebuilding queue; and rebuild the first and second group of encoded data slices based on a rebuilding prioritization protocol.

10. The computer readable memory device of claim 9, wherein the at least one memory section stores further operational instructions that causes the one or more computing devices to scan by:

sending list requests to storage units of the storage network, wherein the list requests include a request to list slice names of encoded data slices being stored by the respective storage units;

receiving list responses from the storage units, wherein the list responses include a list of slice names of encoded data slices that are stored by the respective storage units; and interpreting the list of slice names of encoded data slices that are stored by the respective storage units to identify the encoded data slices to include in the rebuilding process.

11. The computer readable memory device of claim 9, wherein the rebuilding prioritization function comprises:

a loss of data risk analysis function that is executed on a set of encoded data slices by set of encoded data slices basis.

12. The computer readable memory device of claim 11, wherein the at least one memory section stores further operational instructions that causes the one or more computing devices to rebuild by:

for a set of encoded data slices of the one or more plurality of sets of encoded data slices or of the other one or more plurality of sets of encoded data slices:

determining a pillar number, a decode threshold number, and a number of encoded data slices in the set of encoded data slices associated with the rebuilding process;

determining a redundancy value based on a difference between the pillar number and the decode threshold number;

determining a slice risk value based on a difference between the redundancy value and the number of encoded data slices in the set of encoded data slices associated with the rebuilding process;

determining a storage unit reliability level of a set of storage units of the storage network that is storing the set of encoded data slices;

generating a loss of data risk indication based on the slice risk vale and the storage unit reliability level; and when the loss of data risk indication is above a threshold, placing one or more encoded data slices of the set of encoded data slices associated with the rebuilding process in the first group of encoded data slices.

13. The computer readable memory device of claim 9, wherein the at least one memory section stores further operational instructions that causes the one or more computing devices to rebuild by:

determining whether a time to rebuild the first group of encoded data slices will exceed a priority rebuild time threshold; and when the time to rebuild the first group of encoded data slices will exceed the priority rebuild time threshold, allocating a sub-group of the first group of encoded data slices for rebuilding by at least one computing device of the one or more computing devices.

14. The computer readable memory device of claim 9, wherein the rebuilding prioritization protocol comprises one of:

rebuilding the first group of encoded data slices before rebuilding the second group of encoded data slices;

rebuilding the first and second group of encoded data slices in an imbalanced round robin manner, wherein the rebuilding of the first group of encoded data slices is weighted greater than the rebuilding of the second group of encoded data slices; and rebuilding the first and second group of encoded data slices in accordance with an anti-starvation protocol.

15. The computer readable memory device of claim 9, wherein the at least one memory section stores further operational instructions that causes the one or more computing devices to:

when an encoded data slice has been in the second group of encoded data slices for a predetermined period of time, re-analyze the encoded data slice based on the rebuilding prioritization function to determine whether the encoded data slice should be moved to the first group of encoded data slices; and when determined to move the encoded data slice to the first group of encoded data slices, transfer the encoded data slice to the first group of encoded data slices.

16. The computer readable memory device of claim 9, wherein the at least one memory section stores further operational instructions that causes the one or more computing devices to:

transfer a third group of encoded data slices in the first level rebuilding queue into a fourth rebuilding queue based on the analyzing, wherein the third rebuilding queue has priority over the fourth rebuilding queue; and rebuild the first, second, and third group of encoded data slices based on the rebuilding prioritization protocol.

* * * * *